United States Patent
Niu et al.

(10) Patent No.: US 11,137,629 B2
(45) Date of Patent: Oct. 5, 2021

(54) CLEARING CIRCUIT FOR LIQUID CRYSTAL APPARATUS

(71) Applicant: GENTEX CORPORATION, Zeeland, MI (US)

(72) Inventors: Xiaoxu Niu, Grand Rapids, MI (US); Robert R. Turnbull, Holland, MI (US); Adam R. Heintzelman, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 17/184,243

(22) Filed: Feb. 24, 2021

(65) Prior Publication Data

US 2021/0263359 A1   Aug. 26, 2021

Related U.S. Application Data

(60) Provisional application No. 62/980,621, filed on Feb. 24, 2020.

(51) Int. Cl.
*G02F 1/133* (2006.01)
*G02F 1/137* (2006.01)
(Continued)

(52) U.S. Cl.
CPC .......... *G02F 1/13306* (2013.01); *G02F 1/137* (2013.01); *H02H 9/005* (2013.01); *H02M 3/00* (2013.01)

(58) Field of Classification Search
CPC .................................................. G02F 1/13306
See application file for complete search history.

(56) References Cited

U.S. PATENT DOCUMENTS 5,539,547 A   7/1996 Ishii et al.
7,528,828 B2   5/2009 Nakajima
(Continued)

FOREIGN PATENT DOCUMENTS

WO   2003069396 A2   8/2003

OTHER PUBLICATIONS

International Search Report dated Jun. 3, 2021, for corresponding PCT application No. PCT/US2021/019441, 2 pages.
(Continued)

*Primary Examiner* — Edmond C Lau
(74) *Attorney, Agent, or Firm* — Price Heneveld LLP; Bradley D. Johnson

(57) ABSTRACT

A control apparatus for an electro-optic element comprises a first voltage converter in connection with a power supply. The first voltage converter is configured to receive a supply voltage from the power supply and output a first voltage. A first storage capacitor is in connection with the first voltage converter and configured to store first energy at the first voltage. A second storage capacitor is configured to store second energy at a second voltage, wherein the second energy is supplied by the power supply. A driving circuit in conductive connection with the second storage capacitor and configured to supply a driving voltage to the electro-optic element. In response to a failure of the power supply, the first storage capacitor is configured to supply the first energy to a controller and the second storage capacitor is configured to supply the second energy to the driving circuit.

18 Claims, 4 Drawing Sheets

(51) Int. Cl.
*H02H 9/00* (2006.01)
*H02M 3/00* (2006.01)

(56) References Cited

U.S. PATENT DOCUMENTS

| | | | |
|---|---|---|---|
| 8,558,821 B2 | 10/2013 | Yu et al. | |
| 2001/0043181 A1 | 11/2001 | Park | |
| 2015/0092458 A1* | 4/2015 | Levy | H02M 1/4208 |
| | | | 363/21.12 |
| 2016/0299387 A1* | 10/2016 | Yamazaki | G02F 1/133553 |
| 2021/0125542 A1* | 4/2021 | Liu | H02M 3/1582 |

OTHER PUBLICATIONS

Written Opinion dated Jun. 3, 2021, for corresponding PCT application No. PCT US2021/019441, 4 pages.

* cited by examiner

CLEARING CIRCUIT FOR LIQUID CRYSTAL APPARATUS

CROSS REFERENCE TO RELATED APPLICATIONS

This application claims the benefit of and priority to U.S. Provisional Patent Application No. 62/980,621, filed on Feb. 24, 2020, entitled Clearing Circuit For Liquid Crystal Apparatus, the entire disclosure of which is hereby incorporated herein by reference.

TECHNOLOGICAL FIELD

The present disclosure relates generally to a control circuit for a liquid crystal device and, more particularly, relates to a control circuit configured to control a liquid crystal device to a transparent state in response to a power failure.

BACKGROUND OF THE INVENTION

In various applications, electrical or electro-mechanical devices may be implemented to improve a user experience, convenience, and/or functionality. However, such innovations and technologic implementations may be required to operate under a variety of failure states or conditions in order to be suitable for daily use. Accordingly, the disclosure provides for a control system configured to control a state of such a device in a variety of operational conditions including a power supply failure.

SUMMARY

According to one aspect, a control apparatus for an electro-optic element may comprise: a first voltage converter in connection with a power supply, the first voltage converter configured to receive a supply voltage from the power supply and output a first voltage; a first storage capacitor in connection with the first voltage converter and configured to store first energy at the first voltage; a second storage capacitor configured to store second energy at a second voltage, the second energy supplied by the power supply; a driving circuit in conductive connection with the second storage capacitor and configured to supply a driving voltage to the electro-optic element; a controller in connection with the first voltage converter and the first storage capacitor, the controller configured to supply a control signal to the driving circuit to control a state of the electro-optic element. In response to a failure of the power supply, the first storage capacitor may be configured to supply the first energy to the controller and the second storage capacitor may be configured to supply the second energy to the driving circuit. The first energy and the second energy may be sufficient to power the controller and the driving circuit respectively to transition the electro-optic element from a first state to a second state.

The control apparatus further may comprise: a second voltage converter in connection with the power supply. The second voltage converter may be configured to receive the supply voltage from the power supply and output the second voltage. The control apparatus further may comprise a step-up transformer configured to increase the second voltage output from the second voltage converter to the driving voltage and supply the driving voltage to the electro-optic element. The second voltage converter may comprise a DC converter configured to: increase the supply voltage to the second voltage, wherein the second voltage may be the driving voltage; and supply the driving voltage to the driving circuit and the second storage capacitor. The DC converter may comprise one of a boost converter, a flyback converter, and a single-ended primary-inductor converter (SEPIC). The first voltage converter may comprise one of a linear regulator and a switching regulator. The second voltage converter may comprise one of a linear regulator and a switching regulator. The control apparatus further may comprise a power monitor input configured to detect the power signal. The control apparatus further may comprise a transient protection circuit may comprise at least one of a capacitor, a transistor, and a diode; wherein the supply voltage may be delivered through the transient protection circuit. The electro-optic element may be disposed in one of a window, a window pane, and a selectively transparent panel.

According to another aspect, a control apparatus for an electro-optic element may comprise: a first voltage converter in connection with a power supply, wherein the first voltage converter is configured to receive a supply voltage from the power supply and to output a first voltage; a second voltage converter in connection with the power supply, wherein the second voltage converter is configured to receive the supply voltage from the power supply and to output a second voltage; a third voltage converter in connection with the power supply, wherein the third voltage converter is configured to receive the supply voltage from the power supply and to output a third voltage; a first storage capacitor in connection with the first voltage converter and configured to store first energy at the first voltage; a second storage capacitor in connection with the second voltage converter and configured to store second energy at the second voltage; a third storage capacitor in connection with the third voltage converter and configured to supply third energy at the third voltage; a processor in connection with the first voltage converter and the first storage capacitor, wherein the processor is configured to provide a control signal at the first voltage; a driving circuit in conductive connection with the third storage capacitor and configured to supply a driving voltage to the electro-optic element, wherein the third voltage is a nominal supply voltage to operate the driving circuit, and where the third storage capacitor has sufficient capacity to operate the driving circuit; and a controller in connection with the second voltage converter and the second storage capacitor, wherein the controller is configured to supply a control signal to the driving circuit to control a state of the electro-optic element. In response to a failure of the power supply, the first storage capacitor may be configured to supply the first energy to the processor, the second storage capacitor may be configured to supply the second energy to the driving circuit, and the third storage capacitor may be configured to supply the third energy to the driving circuit. The first energy and the second energy may be sufficient to power the controller and the driving circuit respectively to transition the electro-optic element from a first state to a second state.

The control apparatus may further comprise a step-up transformer configured to increase the second voltage output from the second voltage converter to the driving voltage and supply the driving voltage to the electro-optic element. The electro-optic device may further comprise a transient protection circuit comprising at least one of a capacitor, a transistor, and a diode. The supply voltage may be delivered through the transient protection circuit. The electro-optic element may be disposed in one of a window, a window pane, and a selectively transparent panel.

According to another aspect, an electro-optic system may comprise: an electro-optic device, comprising a first substrate having a first conductive layer disposed thereon; a second substrate having a second conductive layer disposed thereon; and an electro-optic medium disposed between the first substrate and the second substrate and in contact with the first and second conductive layers; and a control apparatus may comprise: a first voltage converter in connection with a power supply, wherein the first voltage converter may be configured to receive a supply voltage from the power supply and output a first voltage; a second voltage converter in connection with the power supply, wherein the second voltage converter may be configured to receive supply voltage from the power supply and output a second voltage; a first storage capacitor in connection with the first voltage converter and configured to store first energy at the first voltage; a second storage capacitor in connection with the second voltage converter and configured to store second energy at the second voltage; a driving circuit in conductive connection with the second storage capacitor and configured to supply a driving voltage to the electro-optic element; a controller in connection with the first voltage converter and the first storage capacitor, wherein the controller may be configured to supply a control signal to the driving circuit to control a state of the electro-optic element; wherein in response to a failure of the power supply, the first storage capacitor may be configured to supply the first energy to the controller and the second storage capacitor may be configured to supply the second energy to the driving circuit, wherein the first energy and the second energy may be sufficient to power the controller and the driving circuit respectively to transition the electro-optic element from a first state to a second state.

The second voltage converter may comprise a DC converter configured to: increase the supply voltage to the second voltage, wherein the second voltage may be the driving voltage; and supply the driving voltage to the driving circuit and the second storage capacitor. The control apparatus further may comprise a step-up transformer configured to increase the second voltage output from the second voltage converter to the driving voltage and supply the driving voltage to the electro-optic element.

These and other features, advantages, and objects of the present device will be further understood and appreciated by those skilled in the art upon studying the following specification, claims, and appended drawings.

BRIEF DESCRIPTION OF THE DRAWINGS

The invention will now be described with reference to the following drawings, in which.

DETAILED DESCRIPTION OF EMBODIMENTS

Figure 1:
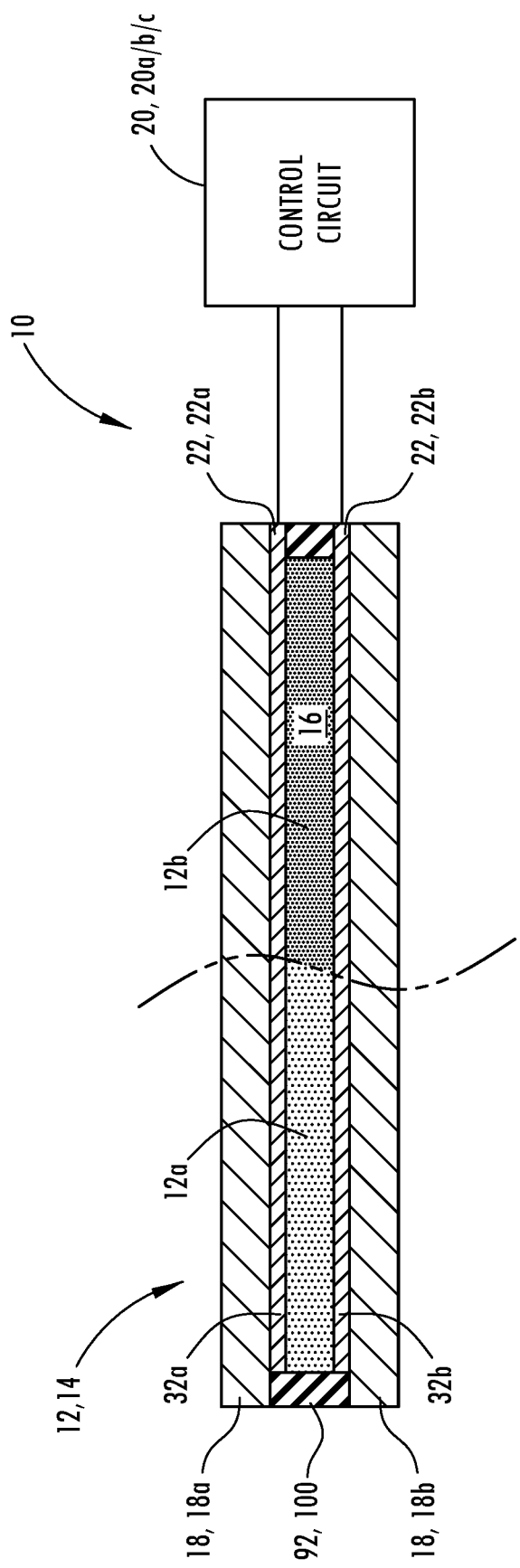
FIG. 1 is a schematic cross-sectional diagram of an electro-optic device in communication with a control device.
Figure 2:
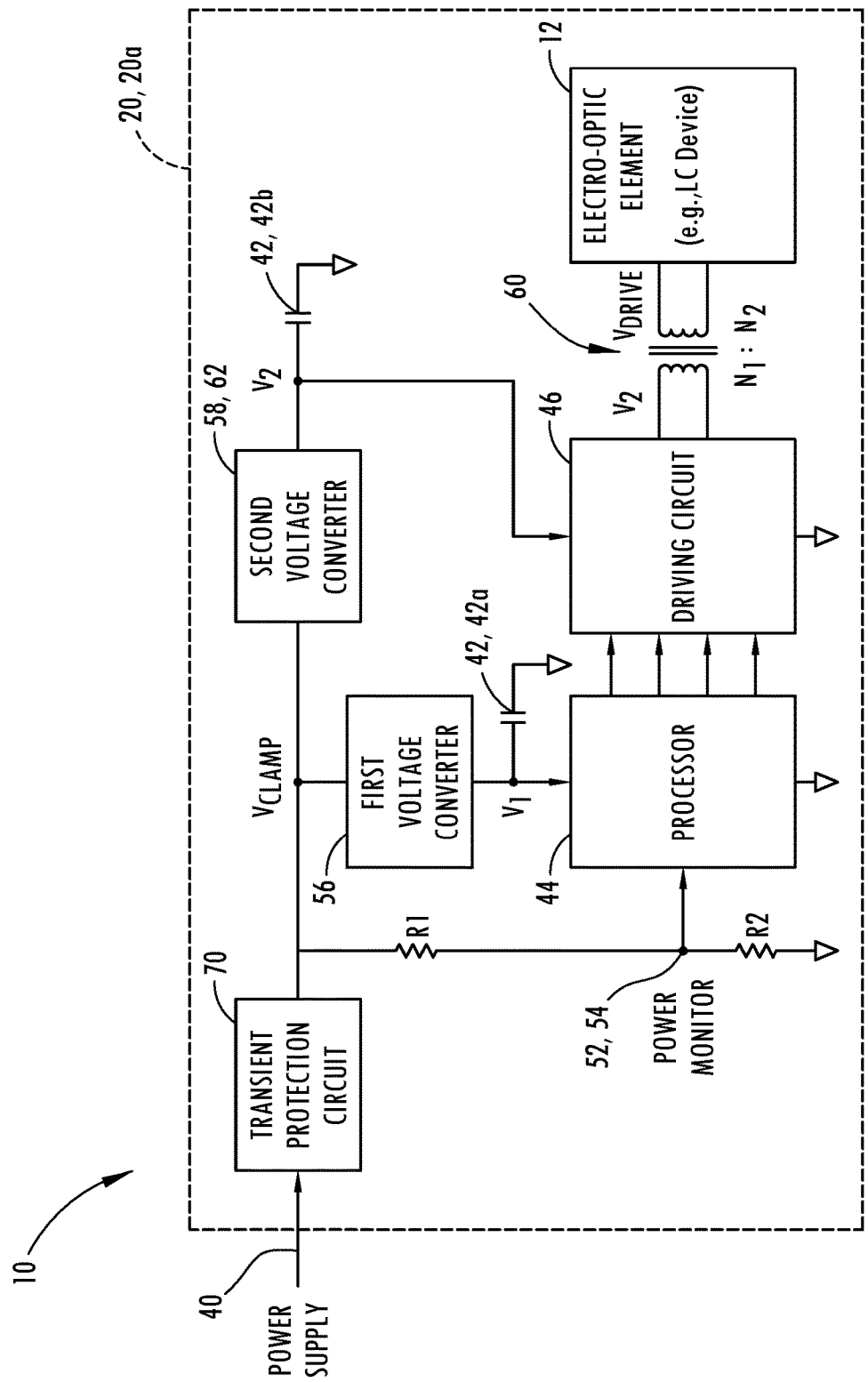
FIG. 2 is a circuit diagram of a control circuit configured to control a state of an electro-optic device in accordance with this disclosure.
Figure 3:
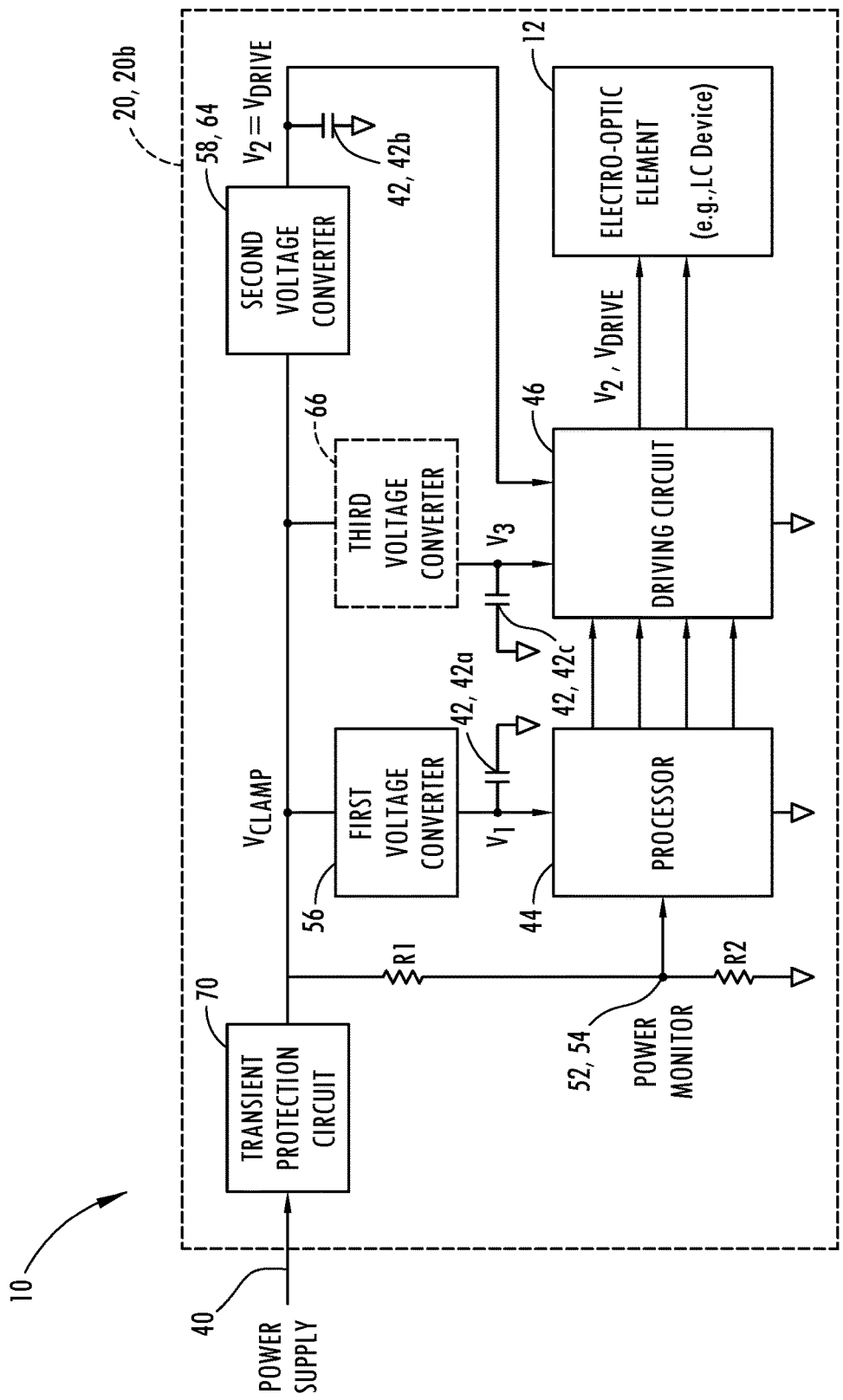
FIG. 3 is a circuit diagram of a control circuit configured to control a state of an electro-optic device in accordance with this disclosure.

Referring generally to FIGS. 1-3, the disclosure provides for a control system 10 for an electro-optic device or element 12. The electro-optic device 12 may correspond to a variety of panels, windows, elements, and/or partitions 14 that may be configured to vary in transmittance or optical transparency in response to the application of an electrical signal. In an exemplary embodiment, the electro-optic device 12 may correspond to a liquid crystal or similar device comprising an electro-optic medium 16 disposed between a plurality of substrates 18 or in connection with at least one substrate. The electro-optic medium 16 may correspond to a liquid crystal material (e.g. a smectic liquid crystal) that may be multi-stable or at least bi-stable among or between a plurality of transmission states. For example, the electro-optic device 12 may be configured to be driven or controlled by a control signal output from a controller 20 or control circuit to a first optical transmission state 12*a* and a second optical transmission state 12*b*. Each of the transmission states may be maintained until the control signal is supplied to electrical terminals 22 of the electro-optic device 12 from the controller 20, thereby providing at least two optical transmission states with respect to an applied electric field. Accordingly, the bi-stable operation of the system 10 may control the transmission state such that, once the control signal is applied or adjusts the structure of the electro-optic device 12 from the first state 12*a* to the second state 12*b*, the electro-optic device 12 will remain in the last state until another control or driving signal is applied.

While such a bi-stable or multi-stable configuration may provide a variety of benefits, the electro-optic device 12 may also require active operation of a controller 20 of the control system 10 in order to adjust the transmission state. For example, if implemented as a smectic liquid crystal, the electro-optic device 12 may be controlled or driven to the first optical transmission state 12*a* providing almost total light transmission or to the second optical transmission state 12*b* providing almost total light scattering. The first state 12*a* may be the result of an alignment of liquid crystal molecules forming the electro-optic medium 16, which may be accomplished by applying a voltage having a first driving frequency approximately greater than 500 Hz. In some implementations, the first driving frequency may be in a range of 1 kHz to 5 kHz.

Adjusting the electro-optic device 12 from the first state 12*a* to the second state 12*b* may be controlled via the controller 20. The second state 12*b* may be the result of the scattering of molecules forming the electro-optic medium 16, which may be accomplished by applying a voltage having a second driving frequency approximately less than 500 Hz. In some implementations, the second driving frequency may be in a range of 10 Hz to 200 Hz. Accordingly, the first driving frequency may be significantly greater than the second driving frequency and may be one to several orders of magnitude greater. As previously discussed, the controller 20 may be configured to supply such control signals to effectively accomplish such a transition from the first state 12*a* to the second state 12*b*. However, in order to accomplish such control, the controller 20 of the system 10 must remain operational even in the event of a power supply failure as discussed in reference to the exemplary control circuits 20*a* and 20*b* discussed in reference to FIGS. 2 and 3.

In various aspects, the electro-optic device 12 or partition 14 may correspond to a window, window pane, or transparent panel. As shown in FIG. 1, the electro-optic medium 16 may be encapsulated or otherwise disposed between a first substrate 18*a* and a second substrate 18*b* of the plurality of substrates 18. Each of the substrates may be formed of a ceramic material, a polymer material, or other at least partially optically transmissive materials. A first conductive layer 32a and a second conductive layer 32b may be disposed on each of the first substrate 18a and the second substrate 18b, respectively, and may be configured to conduct the control signals from the controller 20 to the electro-optic medium 16 from the terminals 22 (e.g. a first terminal 22a and a second terminal 22b). In this way, the controller 20 may be configured to transmit the control signals to the electro-optic device 12 to transition the electro-optic medium 16 from the first state 12a to the second state 12b. prescient The conductive layers 32a and 32b may correspond to transparent conductive materials coated or otherwise disposed on an interior surface of each of the substrates 18 and in conductive connection with the electro-optic medium 16. The conductive layers 32a, 32b may be formed from a transparent conductive material (e.g., indium-tin oxide [ITO]) and may be deposited by a physical vapor deposition process, a sputter deposition process, or various processes. The electro-optic medium 16 may be sealed between the substrates 18 via a seal 34. The seal 34 may extend about a perimeter of the electro-optic device 12 and may retain the electro-optic medium 16 while preventing contaminants from entering the electro-optic device 12. The seal 34 may correspond to a polymeric material and/or adhesive.

Referring now to FIGS. 2 and 3, the control circuits 20a and 20b are discussed in reference to their similar aspects and specific operational elements that may provide for the operation and control of the electro-optic device 12 as discussed herein. In reference to each of the first control circuit 20a and the second control circuit 20b, the various examples of the control system 10 may provide for failure due to loss of power resulting in the electro-optic device 12 failing in a desired state. Accordingly, the control circuits 20a and 20b are discussed herein using like reference numerals to identify corresponding elements for clarity. As may be understood by those having skill in the art, various similar and differing components demonstrated in FIGS. 2 and 3 may be applied interchangeably based on the function of the components. Accordingly, the examples illustrated and discussed in reference to FIGS. 2 and 3 shall not be considered to limit the invention to specific subject matter depicted in either example unless expressly recited in the claims. In general, the controller 20 may be configured to control the electro-optic device 12 to transition to the first state 12a, which may be optically transparent, in response to a loss of power delivered from a power supply 40. Further, detailed examples are discussed later in reference to each of FIGS. 2 and 3 independently.

In general, the control circuits 20a and 20b may comprise at least one energy storage element 42, which may be in the form of a capacitor or a hold-up capacitor in the configurations shown. Accordingly, the at least one storage element 42 may be configured to supply electrical power to a processor 44 and a switching or driving circuit 46. In various implementations, the control circuits 20a and 20b comprise a first storage element 42a configured to store energy at a voltage potential suitable to sustain an operation of the processor 44 for a first predetermined period of time. Additionally, the control circuits 20a and 20b may comprise a second storage element 42b configured to sustain an operation of the driving circuit 46 for a second predetermined period of time. In this configuration, the energy storage elements 42 may be configured to supply energy to the processor 44 and the driving circuit at different voltages to suit the operating potential, the logical control, and driving power, respectively, to operate the control circuits 20a and 20b. As discussed herein, the processor 44 may correspond to a microprocessor, microcontroller, application-specific integrated circuit (ASIC), or other circuitry configured to perform various input/output, control, processing, and other functions to be described herein.

In operation, the operation of the processor 44 and the driving circuit 46 may be required to be approximately coextensive to maintain operation of the system 10. Accordingly, the first storage element 42a and the second storage element 42b may be configured to sustain operation of the processor 44 and driving circuit 46, such that the first and second predetermined operating times are approximately coextensive or at least sufficient to supply power to control a transition of the electro-optic element 12. For example, the power stored in the first storage element 42a and the second storage element 42b may be sufficient to control the driving circuit 46 to supply the control signal to the electro-optic device 12 for a duration and/or intensity sufficient to adjust the electro-optic element 12 from the second state 12b to the first state 12a.

As will be understood by those having skill in the art, the particular capacity of each of the energy storage elements 42 may be calculated or determined based on a the specific power draw of the processor 44 and the driving circuit 46 to transition the electro-optic device 12 from the first state 12a to the second state 12b. Such power requirements may vary based on the specific characteristics (e.g. efficiency, proportions, etc.) of the electro-optic element 12. Accordingly, the system 10 may be configured to ensure that the control circuits 20a and 20b may control the electro-optic element to achieve the first state 12a or a state of substantial optical transparency in the event of a failure of the power supply 40.

For example, the system 10 may provide for an automatic detection and control of the electro-optic element 12 from the first state 12a to the second state 12b following the detection of a failure of the power supply 40. That is, in the event of a power failure, each of the control circuits 20a and 20b may be configured to detect a loss of power from the power supply 40 and automatically activate the driving circuit 46 to drive the electro-optic element 12 to a desired state. For example, if the crystalline structure is implemented in a window, it may be desirable to ensure that the system fails to a clear or light transmissive state. In the example of the smectic liquid crystal implemented in the electro-optic element 12, the processor 44 may be configured to control the electro-optic element 12 to the first optical transmission state 12a, thereby providing almost total light transmission. The processor 44 may be configured to control the transition from the second optical transmission state 12b to the first optical transmission state 12a by controlling a driving voltage $V_{Drive}$ via the driving circuit 46. As previously discussed, in order to clear the electro-optic element 12 to a transparent or light transmissive state, the processor 44 may control the driving circuit 46 to output the first driving frequency approximately greater than 500 Hz.

The power supply 40 may generally be delivered to the system 10 from a power supply source, which may be conducted from a main power supply, an electro-mechanical generator (e.g. an alternator), a battery, or various forms of power supplies. As depicted in FIGS. 2 and 3, the processor 44 may comprise a power monitor input 52. The power monitor input 52 may be configured to detect a power signal conducted at a predetermined voltage detection range. The power signal may be conducted from a supply voltage $V_{CLAMP}$ across a first resistor R1 to provide for a power monitor node 54. The power monitor node 54 may further be shunted to ground across a second resistor R2. In this configuration, when the supply voltage $V_{CLAMP}$ is delivered to the control circuit 20, the power signal will be delivered to the processor 44 at the predetermined voltage range and the processor 44 can detect the delivery of the supply voltage $V_{CLAMP}$.

In order to supply the operating power to the processor, a first voltage converter 56 may be in conductive connection with the supply voltage $V_{CLAMP}$. The first voltage converter 56 may correspond to a linear or switching voltage regulator configured to convert the supply voltage $V_{CLAMP}$ to the first voltage $V_1$. The first voltage $V_1$ may correspond to an operating voltage of the processor 44 for operation. The output of the first voltage converter 56 may further be in connection with the first storage element 42a. In this configuration, the first storage element 42a may function as a hold-up capacitor configured to supply power to the processor 44 in the event of an interruption to the supply voltage $V_{CLAMP}$. As previously discussed, the capacity of the first storage element 42a may be sufficient to sustain operation of the processor 44 for a predetermined time that may be necessary to control the driving circuit 46 to transition the electro-optic element 12 from the second optical transmission state 12b (e.g., scattered, limited transmission) to the first optical transmission state 12a (e.g., transmissive, optically transparent) following the loss or interruption of power to the power supply 40.

Still referring to FIGS. 2 and 3, each of the control circuits 20a and 20b may comprise the driving circuit 46 in connection with a second voltage converter 58. The second voltage converter 58 may be implemented in a variety of ways alone or in combination with a transformer 60 or step-up transformer to deliver driving voltage $V_{Drive}$ to the electro-optic element 12. Accordingly, the second voltage converter 58 may be configured to convert the supply voltage $V_{CLAMP}$ to the driving voltage $V_{Drive}$ supplied to the electro-optic element 12, as demonstrated in FIG. 3. In this case, a second voltage $V_2$ output from the second voltage converter 58 may be same voltage potential as the driving voltage $V_{Drive}$. Additionally, in the example depicted in FIG. 2, the second voltage converter 58 may be configured to convert the supply voltage $V_{CLAMP}$ to a second voltage $V_2$, which may correspond to voltage configured to be up-converted by the transformer 60 to the driving voltage $V_{Drive}$. In each instance, the second storage element 42b may be in connection with an output of the second voltage converter 58. In the example of FIG. 3, the second storage element 42b may provide an advantage by storing energy at the driving voltage $V_{Drive}$.

Similar to the storage element 42a, the second storage element 42b may function as a hold-up capacitor. The second storage element 42b may be configured to supply power to the driving circuit 46 in the event of an interruption to the supply voltage $V_{CLAMP}$. The capacity of the second storage element 42b may be sufficient to sustain operation of the driving circuit 46 for a predetermined time that may be necessary to control the driving circuit 46 to transition the electro-optic element 12 from the second optical transmission state 12b (e.g., scattered, limited transmission) to the first optical transmission state 12a (e.g., transmissive, optically transparent) following the loss or interruption of power to the power supply 40. Accordingly, each of the storage elements 42 may be configured to supply operating power to the control circuits 20a and 20b, such the electro-optic element may be controlled to a significantly light transmissive state in the event of a power failure to the power supply.

As discussed herein, the storage elements 42 are described as storing sufficient energy to supply the processor 44 and the driving circuit 46 for a predetermined time necessary to transition the electro-optic element 12 from the second optical transmission state 12b to the first optical transmission state 12a. In each respective application of the storage elements 42, the corresponding energy necessary to sustain operation of the processor 44 or the driving circuit 46 may differ, but for a specific system, the energy required to sustain operation may be determined as a product of the power required to operate the processor 44 or the driving circuit 46 in connection with a specific implementation of the electro-optic element 12 over the time required to complete the transition. Accordingly, the specific storage capacity of each of the storage elements 42 may significantly vary based on the application.

For example, if the transition from the second optical transmission state 12b to the first optical transmission state 12a requires 20 seconds of operation of the system 10, each of the storage elements 42 may be implemented with sufficient storage energy to respectively supply the processor 44 and the driving circuit 46 the requisite operating current at the corresponding operating voltage (e.g. $V_1, V_2, V_3$, etc.) to sustain at least 20 seconds of operation. The storage energy required may also be over-estimated to ensure that the energy is sufficient in various conditions where the power draw may increase or additional time is required to complete the transition (e.g. 30 seconds). Accordingly, the requisite energy storage of the storage elements 42 may be determined based on the specific application and corresponding power requirements for the processor 44, the driving circuit 46, the electro-optic element 12, and any additional elements that may be incorporated in the system 10. In this way, the disclosure provides for a flexible solution that may be tailored to suit a variety of applications.

Referring now to FIG. 2, the second voltage converter 58 may be implemented as a voltage regulator 62 (e.g., a linear regulator—shunt or series, switching regulator, etc.). In such instances, the voltage regulator 62 may be configured to convert the supply voltage $V_{CLAMP}$ to the second voltage $V_2$, which may be less than the supply voltage $V_{CLAMP}$ and the driving voltage $V_{Drive}$. The second voltage $V_2$ may then be up-converted to the driving voltage $V_{Drive}$ based on a winding ratio $N_1:N_2$ of the primary and secondary windings of the transformer 60. In this way, the second voltage $V_2$ may be output from the second voltage converter 58, supplied to the second storage element 42b and the driving circuit 46, and up-converted by the transformer 60 to the driving current supplied to the electro-optic element 12. The second voltage $V_2$ may be stored in the second storage element 42b and supplied to the driving circuit 46 and the transformer 60 to transition the state of the electro-optic element 12 in the event of a power failure.

Referring to FIG. 3, the second voltage converter 58 may be implemented as a DC converter 64. In operation, the DC converter 64 may be configured to convert the supply voltage $V_{CLAMP}$ to the second voltage $V_2$, which may correspond to the driving voltage $V_{Drive}$ of the electro-optic device 12. The DC converter 64 may be implemented as one of a variety of devices configured to up-convert a DC voltage. For example, the DC converter 64 may be implemented as a boost converter, a flyback converter, a single-ended primary-inductor converter (SEPIC), or similar device. As shown, the output from the DC converter may be supplied to each of the second storage element 42b and the driving circuit 46. Accordingly, the DC converter 64 may be configured to convert the supply voltage $V_{CLAMP}$ to the driving voltage $V_{Drive}$ of the electro-optic element 12. Though discussed as separate implementations, the transformer 60 and the DC converter 64 may be implemented in combination to adjust the voltage for the operation of the control circuits 20a and 20b without departing from the spirit of the disclosure.

Additionally, in some implementations, the processor 44 may require a different operating voltage than the driving circuit 46. For example, the transistors or switching devices of the driving circuit 46 may be activated by a control signal from the processor 44 at a first voltage $V_1$ but may require a different third voltage $V_3$ as a nominal supply voltage to operate the driving circuit 46. In such cases, the control circuit 20b, as shown, may further comprise a third voltage converter 66 configured to convert the supply voltage $V_{CLAMP}$ to the third voltage $V_3$, which may correspond to the nominal voltage for operation of the driving circuit 46. Similar to the first voltage converter 56, the third voltage converter 66 may correspond to a linear or switching voltage regulator configured to convert the supply voltage $V_{CLAMP}$ to the third voltage $V_3$. The output of the third voltage converter 66 may further be in connection with the third storage element 42c. In this configuration, the third storage element 42c may function as a hold-up capacitor configured to supply power to the driving circuit 46 in the event of an interruption to the supply voltage $V_{CLAMP}$. As previously discussed, the capacity of the third storage element 42c may be sufficient to sustain operation of the driving circuit 46 for a predetermined time and corresponding energy usage of the driving circuit 46 that may be necessary to control the driving circuit 46 to transition the electro-optic element 12 from the second optical transmission state 12b (e.g., scattered, limited transmission) to the first optical transmission state 12a (e.g., transmissive, optically transparent) following the loss or interruption of power to the power supply 40. Though discussed in reference to the control circuit 20b, a similar configuration may be implemented with the control circuit 20a.

As shown in FIGS. 2 and 3, the supply voltage $V_{CLAMP}$ may be delivered to the control circuits 20a and 20b via a transient protection circuit 70. The transient protection circuit may comprise one or more capacitors, transistors, diodes (e.g. Schottky diodes) and other direction or voltage regulation devices. The inclusion of the transient protection circuit 70 may prevent unwanted variations in the supply voltage $V_{CLAMP}$, which may limit the life of various components of the control circuits 20a and 20b resulting in operating faults. For example, in some environments, particularly those related to transit vehicles or transportation, the power delivered from the power supply 40 may vary up to 50V for surges and may even exceed 100V for transient spikes. Accordingly, the transient protection circuit 70 may be included to control and limit fluctuations in the power supply 40 over short durations.

The driving circuit 46 may correspond to one or more switching devices (e.g. transistors, metal-oxide-semiconductor field-effect transistors (MOSFETs), power MOSFETs, insulated-gate bipolar transistors (IGBTs), etc. In each instance, the driving circuit 46 may be configured to control the switching frequencies supplied to the electro-optic element 12 at the driving voltage $V_{Drive}$ and requisite current for the devices discussed herein. In an exemplary embodiment, the driving circuit 46 may correspond to an H-bridge driver, which may comprise a plurality of switches (e.g., transistors) in combination with directional conductors (e.g., diodes, Zener diodes) that may be supplied with a plurality of control signals from the processor 44.

Figure 4:
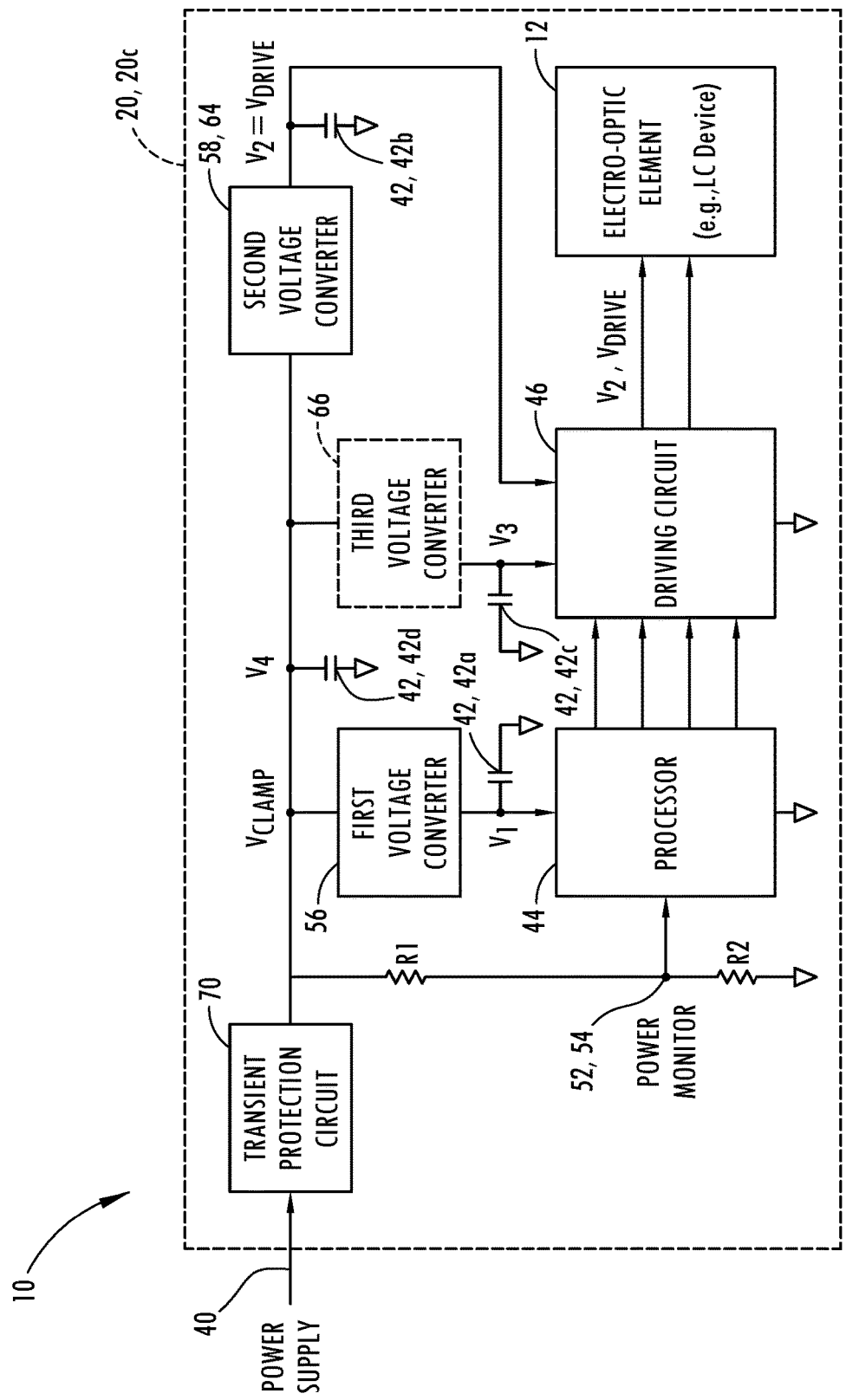
FIG. 4 is a circuit diagram of a control circuit configured to control a state of an electro-optic device in accordance with this disclosure.

Referring now to FIG. 4, in some embodiments, Control circuit 20c may comprise an energy storage element 42d configured to supply energy to both the processor 44 for a first predetermined period of time and the driving circuit 46 for a second predetermined period of time in the event of an interruption to the supply voltage $V_{CLAMP}$. Voltage converters 56, 58, and 66 may be configured to adjust the voltage to suit the needs of the circuit components. The capacity of the energy storage element 42d may be sufficient to sustain operation of both the processor 44 for a first predetermined period of time and the driving circuit 46 for a second predetermined period of time. The operation of the processor 44 for the first predetermined period of time and the driving circuit 46 for a second predetermined period of time may be sufficient to transition the electro-optic element 12 from the second optical transmission state 12b (e.g., scattered, limited transmission) to the first optical transmission state 12a (e.g., transmissive, optically transparent) following the loss or interruption of power to the power supply 40. Energy storage element 42d may be configured to sustain operation of the processor 44 and driving circuit 46 such that the first and second predetermined operating times are sufficient to supply power to control a transition of the electro-optic element 12.

Energy storage element 42d may be implemented with sufficient storage energy to supply the processor 44 and the driving circuit 46 the requisite operating current at the corresponding operating voltage (e.g. $V_1$, $V_2$, $V_3$, etc.) to allow the transmission from the second optical transmission state 12b to the first optical transmission state 12a. The storage energy required may also be over-estimated to ensure that the energy is sufficient in various conditions where the power draw may increase or additional time is required to complete the transition.

In this document, relational terms, such as first and second, top and bottom, front and back, left and right, vertical, horizontal, and the like, are used solely to distinguish one entity or action from another entity or action, without necessarily requiring or implying any actual such relationship, order, or number of such entities or actions. These terms are not meant to limit the element which they describe, as the various elements may be oriented differently in various applications. Furthermore, it is to be understood that the device may assume various orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

It will be understood that any described processes or steps within described processes may be combined with other disclosed processes or steps to form structures within the scope of the present disclosure. The exemplary processes disclosed herein are for illustrative purposes and are not to be construed as limiting. It is also to be understood that variations and modifications can be made on the aforementioned methods without departing from the concepts of the present disclosure, and further it is to be understood that such concepts are intended to be covered by the following claims unless these claims by their language expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within at least one of 2% of each other, 5% of each other, and 10% of each other.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A control apparatus for an electro-optic element, the apparatus comprising:
   a first voltage converter in connection with a power supply, wherein the first voltage converter is configured to receive a supply voltage from the power supply and output a first voltage;
   a first storage capacitor in connection with the first voltage converter and configured to store first energy at the first voltage;
   a second storage capacitor configured to store second energy at a second voltage, wherein the second energy is supplied by the power supply;
   a driving circuit in conductive connection with the second storage capacitor and configured to supply a driving voltage to the electro-optic element;
   a controller in connection with the first voltage converter and the first storage capacitor, wherein the controller is configured to supply a control signal to the driving circuit to control a state of the electro-optic element; and
   wherein in response to a failure of the power supply, the first storage capacitor is configured to supply the first energy to the controller and the second storage capacitor is configured to supply the second energy to the driving circuit, wherein the first energy and the second energy are sufficient to power the controller and the driving circuit respectively to transition the electro-optic element from a first state to a second state.

2. The control apparatus according to claim 1, further comprising:
   a second voltage converter in connection with the power supply.

3. The control apparatus according to claim 2, wherein the second voltage converter is configured to receive the supply voltage from the power supply and output the second voltage.

4. The control apparatus according to claim 3, further comprising a step-up transformer configured to increase the second voltage output from the second voltage converter to the driving voltage and supply the driving voltage to the electro-optic element.

5. The control apparatus according to claim 2, wherein the second voltage converter comprises a DC converter configured to:
   increase the supply voltage to the second voltage, wherein the second voltage is the driving voltage;
   and supply the driving voltage to the driving circuit and the second storage capacitor.

6. The control apparatus according to claim 5, wherein the DC converter comprises one of a boost converter, a flyback converter, and a single-ended primary-inductor converter (SEPIC).

7. The control apparatus according to claim 2, wherein the first voltage converter comprises one of a linear regulator and a switching regulator.

8. The control apparatus according to claim 2, wherein the second voltage converter comprises one of a linear regulator and a switching regulator.

9. The control apparatus according to claim 1, further comprising a power monitor input configured to detect the power signal.

10. The control apparatus according to claim 1, further comprising a transient protection circuit comprising at least one of a capacitor, a transistor, and a diode;
    wherein the supply voltage is delivered through the transient protection circuit.

11. The control apparatus according to claim 1, wherein the electro-optic element is disposed in one of a window, a window pane, and a selectively transparent panel.

12. A control apparatus for an electro-optic element, the apparatus comprising:
    a first voltage converter in connection with a power supply, wherein the first voltage converter is configured to receive a supply voltage from the power supply and to output a first voltage;
    a second voltage converter in connection with the power supply, wherein the second voltage converter is configured to receive the supply voltage from the power supply and to output a second voltage;
    a third voltage converter in connection with the power supply, wherein the third voltage converter is configured to receive the supply voltage from the power supply and to output a third voltage;
    a first storage capacitor in connection with the first voltage converter and configured to store first energy at the first voltage;
    a second storage capacitor in connection with the second voltage converter and configured to store second energy at the second voltage;
    a third storage capacitor in connection with the third voltage converter and configured to supply third energy at the third voltage;
    a processor in connection with the first voltage converter and the first storage capacitor, wherein the processor is configured to provide a control signal at the first voltage;

a driving circuit in conductive connection with the third storage capacitor and configured to supply a driving voltage to the electro-optic element, wherein the third voltage is a nominal supply voltage to operate the driving circuit, and where the third storage capacitor has sufficient capacity to operate the driving circuit; and a controller in connection with the second voltage converter and the second storage capacitor, wherein the controller is configured to supply a control signal to the driving circuit to control a state of the electro-optic element;

wherein in response to a failure of the power supply, the first storage capacitor is configured to supply the first energy to the processor, the second storage capacitor is configured to supply the second energy to the driving circuit, and the third storage capacitor is configured to supply the third energy to the driving circuit, wherein the first energy and the second energy are sufficient to power the controller and the driving circuit respectively to transition the electro-optic element from a first state to a second state.

13. The control apparatus according to claim 12, further comprising a step-up transformer configured to increase the second voltage output from the second voltage converter to the driving voltage and supply the driving voltage to the electro-optic element.

14. The electro-optic device according to claim 12, further comprising a transient protection circuit comprising at least one of a capacitor, a transistor, and a diode;
wherein the supply voltage is delivered through the transient protection circuit.

15. The electro-optic device according to claim 12, wherein the electro-optic element is disposed in one of a window, a window pane, and a selectively transparent panel.

16. An electro-optic system comprising:
an electro-optic device, comprising
a first substrate having a first conductive layer disposed thereon;
a second substrate having a second conductive layer disposed thereon; and
an electro-optic medium disposed between the first substrate and the second substrate and in contact with the first and second conductive layers; and a control apparatus comprising:
a first voltage converter in connection with a power supply, wherein the first voltage converter is configured to receive a supply voltage from the power supply and output a first voltage;
a second voltage converter in connection with the power supply, wherein the second voltage converter is configured to receive supply voltage from the power supply and output a second voltage;
a first storage capacitor in connection with the first voltage converter and configured to store first energy at the first voltage;
a second storage capacitor in connection with the second voltage converter and configured to store second energy at the second voltage;
a driving circuit in conductive connection with the second storage capacitor and configured to supply a driving voltage to the electro-optic element;
a controller in connection with the first voltage converter and the first storage capacitor, wherein the controller is configured to supply a control signal to the driving circuit to control a state of the electro-optic element;
wherein in response to a failure of the power supply, the first storage capacitor is configured to supply the first energy to the controller and the second storage capacitor is configured to supply the second energy to the driving circuit, wherein the first energy and the second energy are sufficient to power the controller and the driving circuit respectively to transition the electro-optic element from a first state to a second state.

17. The electro-optic device according to claim 16, wherein the second voltage converter comprises a DC converter configured to:
increase the supply voltage to the second voltage, wherein the second voltage is the driving voltage; and
supply the driving voltage to the driving circuit and the second storage capacitor.

18. The control apparatus according to claim 16, further comprising a step-up transformer configured to increase the second voltage output from the second voltage converter to the driving voltage and supply the driving voltage to the electro-optic element.

* * * * *